US006640986B2

(12) United States Patent
Zakula, Sr. et al.

(10) Patent No.: US 6,640,986 B2
(45) Date of Patent: Nov. 4, 2003

(54) ANTI-SWAY HYDRAULIC SYSTEM FOR GRAPPLER

(75) Inventors: Daniel Brian Zakula, Sr., Mokena, IL (US); Daniel J. Olson, Orland Park, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 0 days.

(21) Appl. No.: 10/092,833

(22) Filed: Mar. 7, 2002

(65) Prior Publication Data

US 2003/0168422 A1 Sep. 11, 2003

(51) Int. Cl.$^{7}$ .................................................. B60P 3/00

(52) U.S. Cl. ....................... 212/273; 212/343; 414/460; 414/591

(58) Field of Search ................................ 212/343, 344, 212/345, 273; 294/81.1, 81.3, 67.5; 414/460, 591

(56) References Cited

U.S. PATENT DOCUMENTS 3,251,496 A * 5/1966 Lamer et al.
4,266,904 A * 5/1981 Fadness ...................... 414/460
4,488,848 A * 12/1984 Kress et al. ................ 414/460
4,519,741 A * 5/1985 Testore ....................... 414/718
4,664,576 A * 5/1987 Coe ........................... 414/55
4,776,748 A * 10/1988 Klein ......................... 414/460
4,795,203 A * 1/1989 Karlsson .................. 294/81.51
5,937,646 A 8/1999 Zakula
6,021,911 A 2/2000 Glickman et al.

* cited by examiner

*Primary Examiner*—Thomas J. Brahan
(74) *Attorney, Agent, or Firm*—Gardner Carton & Douglas LLC

(57) ABSTRACT

A hydraulic system for actuating opposed arms of a grappler for a gantry crane dampens swaying motion of the arms. Within a conduit which carries pressurized fluid to and/or from actuators to pivot the arms, a dampener includes a restrictor having an orifice to restrict the flow in at least one direction. Each of the dampeners can include a respective check valve to permit free flow through one direction of the conduit and to direct reverse flow through the orifice. In a specific embodiment, a load is received between opposed arms of the grappler to seat upon shoes which extend inwardly from the arms. To urge the shoes to remain in secure lifting contact under the load, flow is restricted when the swaying load moves the arm outwardly, permit free motion of the arm when the swaying motion pulls the arm inwardly.

22 Claims, 11 Drawing Sheets

P
T
1200
1202
1201
ARM OUT
ARM IN
112
1202a
1202b
112
110a
110b
114
1201a
1201b
114
114
1201c
1201d
114
110c
110d
112
1202c
1202d
112
ARM OUT
ARM IN

ANTI-SWAY HYDRAULIC SYSTEM FOR GRAPPLER

FIELD OF THE INVENTION

This invention relates to hydraulic actuation systems and more particularly to a hydraulic actuation system for a swing-arm grappler of a gantry crane.

BACKGROUND OF THE INVENTION

Gantry cranes are commonly used in ports, rail yards or other intermodal shipping facilities for lifting and moving objects such as containers and truck trailers. Such cranes are equipped with various grappler mechanisms to accommodate certain container configurations and associated standard latching systems. For example, highway trailers are typically lifted with a grappler having a swing-arm mechanism, and a standard shipping container typically has four twistlock latches located at the upper four corners of the container for lifting with a grappler having a plurality of corresponding twistlocks. Some grapplers are equipped with both swing arms and twistlocks for selective use as appropriate.

A conventional swing arm grappler includes a platform which is movably suspended from upper beams of the gantry crane and two pairs of arms pivotably mounted to the platform. The arms are configured to extend downwardly from the platform along opposite sides of the trailer. A lower end of each of the arms includes a lifting shoe which extends inwardly to reach under and engage a bottom rail of the trailer for lifting.

For pivoting the swing arms, the conventional gantry crane further includes an hydraulic actuation system adapted to move the arms to either an open, unclamped position, in which each of the arms is upwardly pivoted free from the trailer, or a closed, clamped position, in which the arms are pivoted inwardly to engage and lift a trailer from its bottom rail.

The grappler platform is suspended from a trolley mechanism which is movable in a side-to-side or transverse direction along horizontal beams of the gantry crane. When the grappler is holding an elevated object, such as a trailer or shipping container, acceleration and deceleration of the trolley in a transverse direction results in "sway" forces tending to cause the grappler and lifted trailer to swing like a pendulum. The sway motion occurs at the pivot points where the swing arms meet the base.

Unfortunately, conventional hydraulic circuits allow a significant degree of arm sway with a low degree of oscillation decay. Significant sway leads to various problems. For example, the crane operator may have difficulty controlling and positioning a trailer held by swaying grappler arms. In some instances, such swaying can cause the elongate portion of one or more of the arms to be in damaging contact against the lifted trailer. Additionally, crane operation efficiency is diminished because the crane operator must wait for sway motion to adequately decay before continuing, thereby increasing the time per loading or unloading of a container. The swaying motion of the swing arms further results in a rocking action of the respective shoes on the bottom of the trailer, which can damage the trailer and destabilize the lifting contact. Accordingly, a need exists for a hydraulic swing arm actuator which provides improved sway dampening.

SUMMARY OF THE INVENTION

The present invention provides an improvement to a hydraulic swing arm actuation circuit for a grappler. The circuit generally includes at least one hydraulic cylinder mounted to move each of the swing arms between clamped and unclamped positions. The circuit includes conduits which direct pressurized fluid as desired to opposite ends of each cylinder to actuate piston movement in a desired direction. The circuit may be part of a closed-loop system driven by a master hydraulic pump which operates other hydraulic features of the gantry crane. In an embodiment according to teachings of the invention, the hydraulic circuit is equipped with at least one dampener which limits flow to dampen sway while not creating a back pressure that would interfere with the flows needed for actuating motion of the grappler arms. The dampener includes a flow restrictor which, in various embodiments, may be an orifice and/or a counterbalance valve to restrict flow to or from the actuators so that swaying motion decays more quickly.

Additionally, according to an embodiment, one-way, non-restricted flow is permitted in an opposite flow direction to circumvent the restrictor. As a result, the arms are only dampened in an outwardly swaying motion, and so that no dampening is applied to the arms when swaying inwardly. This advantageously enhances the lifting contact of the arms and associated lifting shoes against the load.

An advantage of the present invention is that it provides an improved hydraulic circuit for actuating grappler arms.

Another advantage of the present invention is that it provides a hydraulic system which reduces sway motion of grappler arms.

A further advantage of the present invention is that it provides a hydraulic system for a grappler which allows the grappler to be more easily controlled.

Yet another advantage of the present invention is that it provides a hydraulic system for a grappler which reduces damage to trailers.

Additional features and advantages of the present invention are described in, and will be apparent from, the following description, claims and figures.

Figure 1:
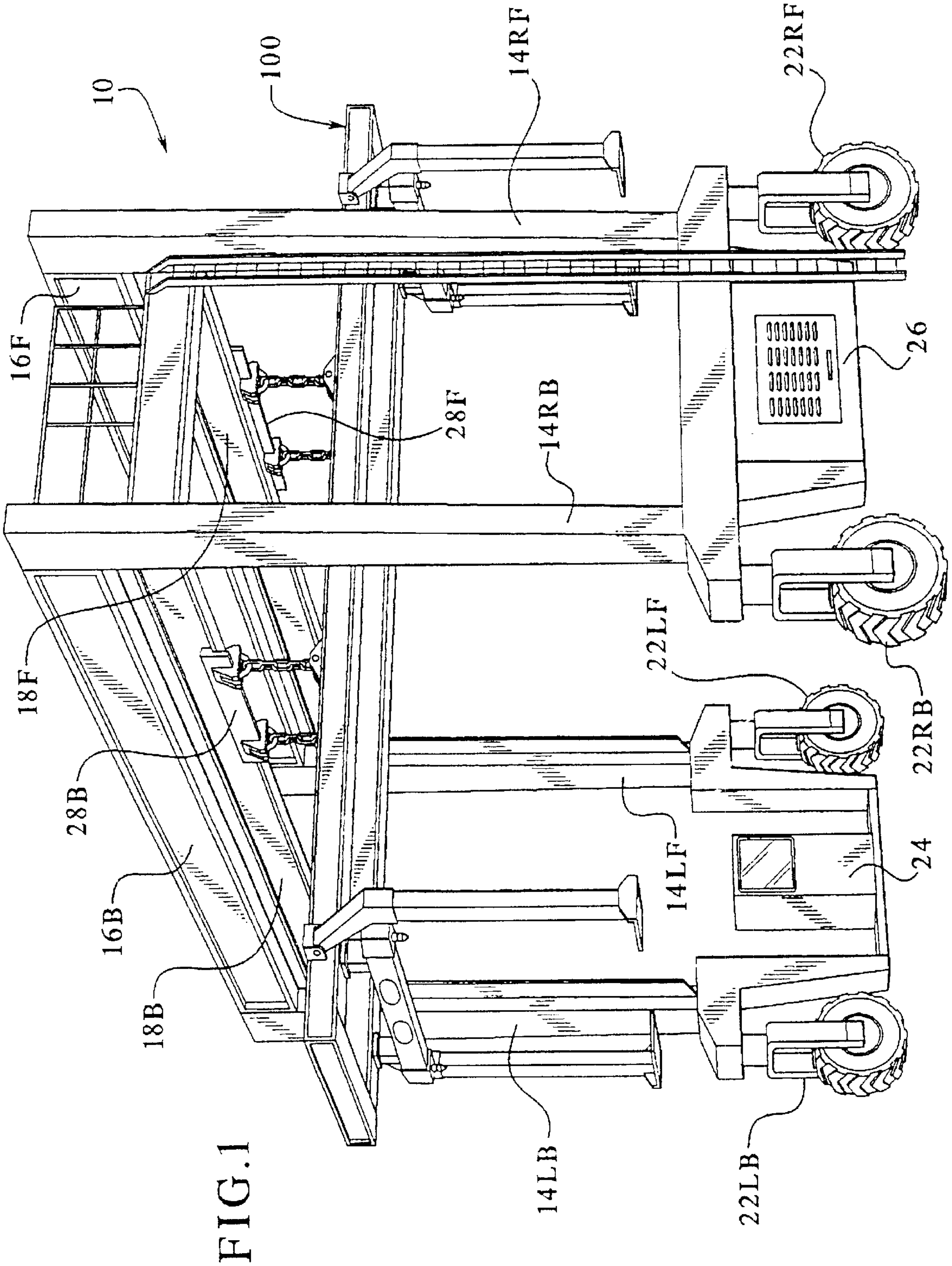
FIG. 1 is a perspective view of a gantry crane having a swing-arm style grappler, the crane having features in accordance with teachings of the invention.
Figure 2:
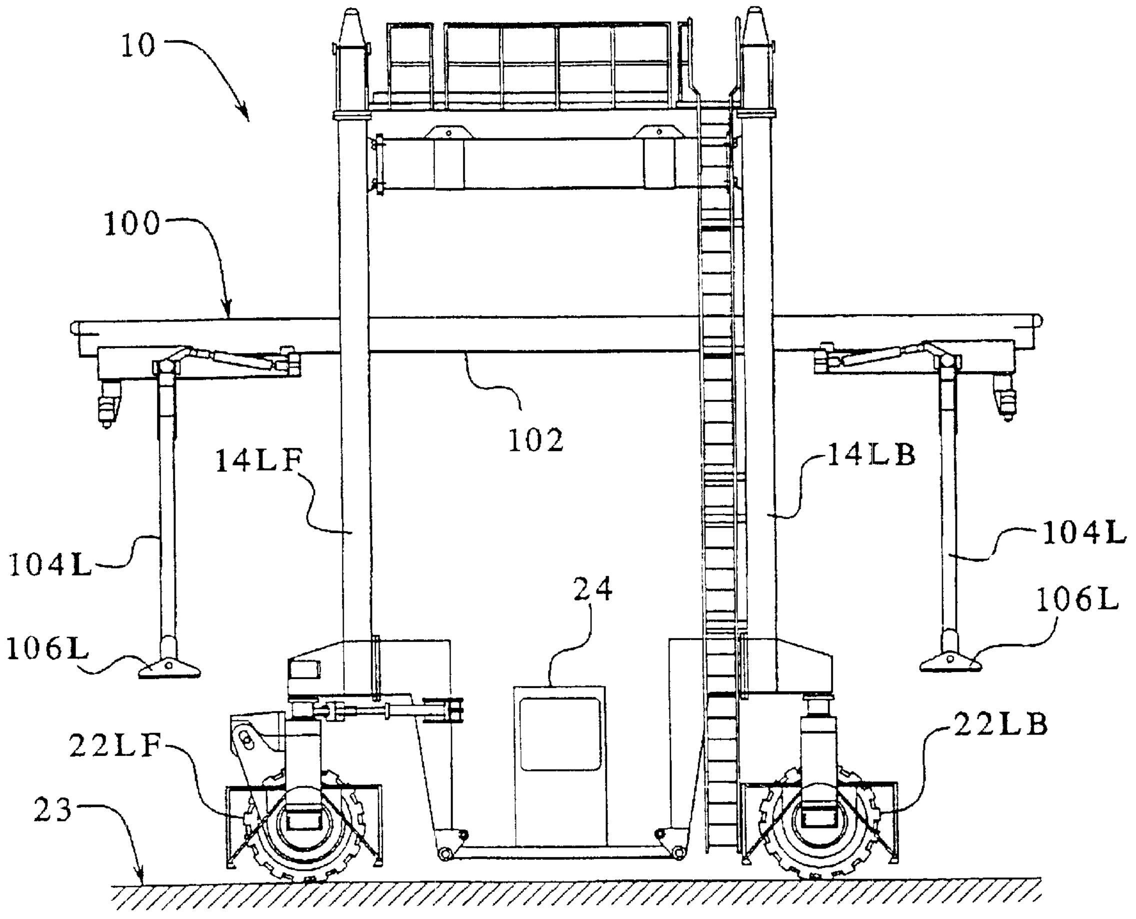
FIG. 2 is a side elevation of the gantry crane of FIG. 1.
Figure 3:
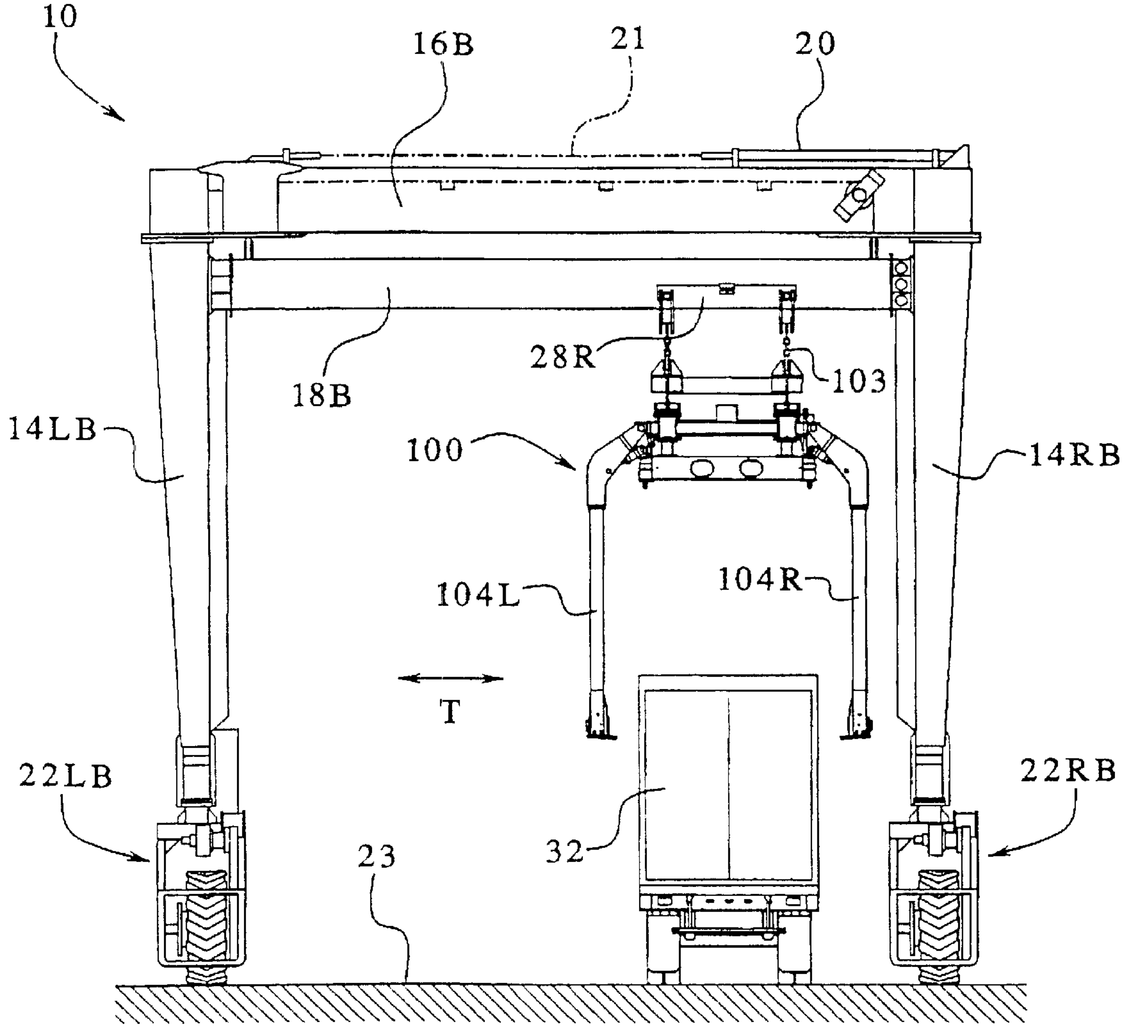
FIG. 3 is a front elevation of the gantry crane of FIGS. 1 and 2.

FIG. **4*a* is a front elevation of the grappler of the gantry crane of FIGS. 1–3**, the grappler having arms which are in an unclamped position free from a trailer to be lifted.

FIG. **4*b* is a front elevation of the grappler of FIG. 3**, the arms in a clamped position and the grappler being elevated to lift the trailer from the ground.

Figure 5:
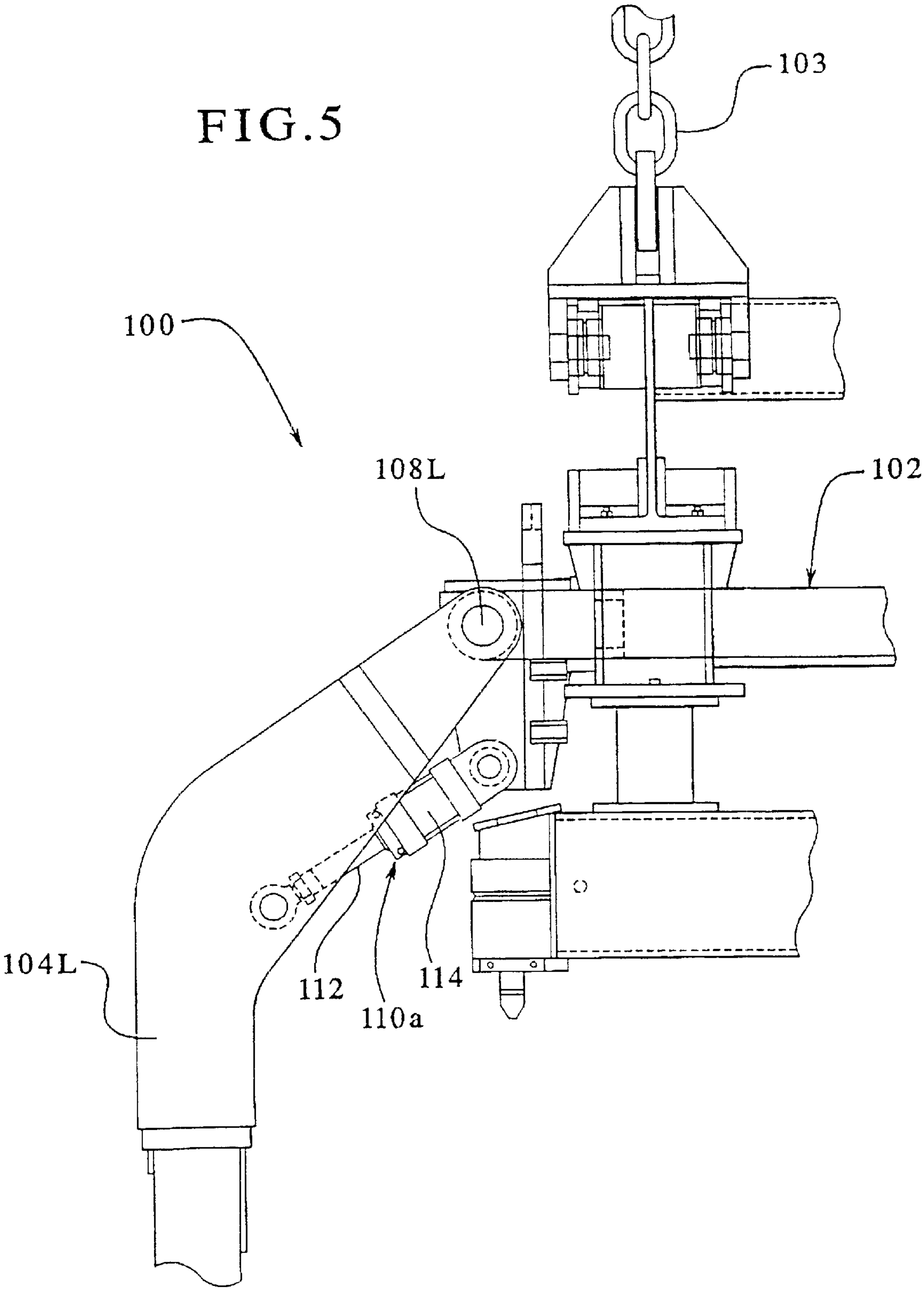

FIG. 5 is a fragmentary front elevation of a portion of the grappler of FIGS. **4*a* and 4*b*** including hydraulic actuation cylinders and the pivoting hinge structure of the grappler.

Figure 6:
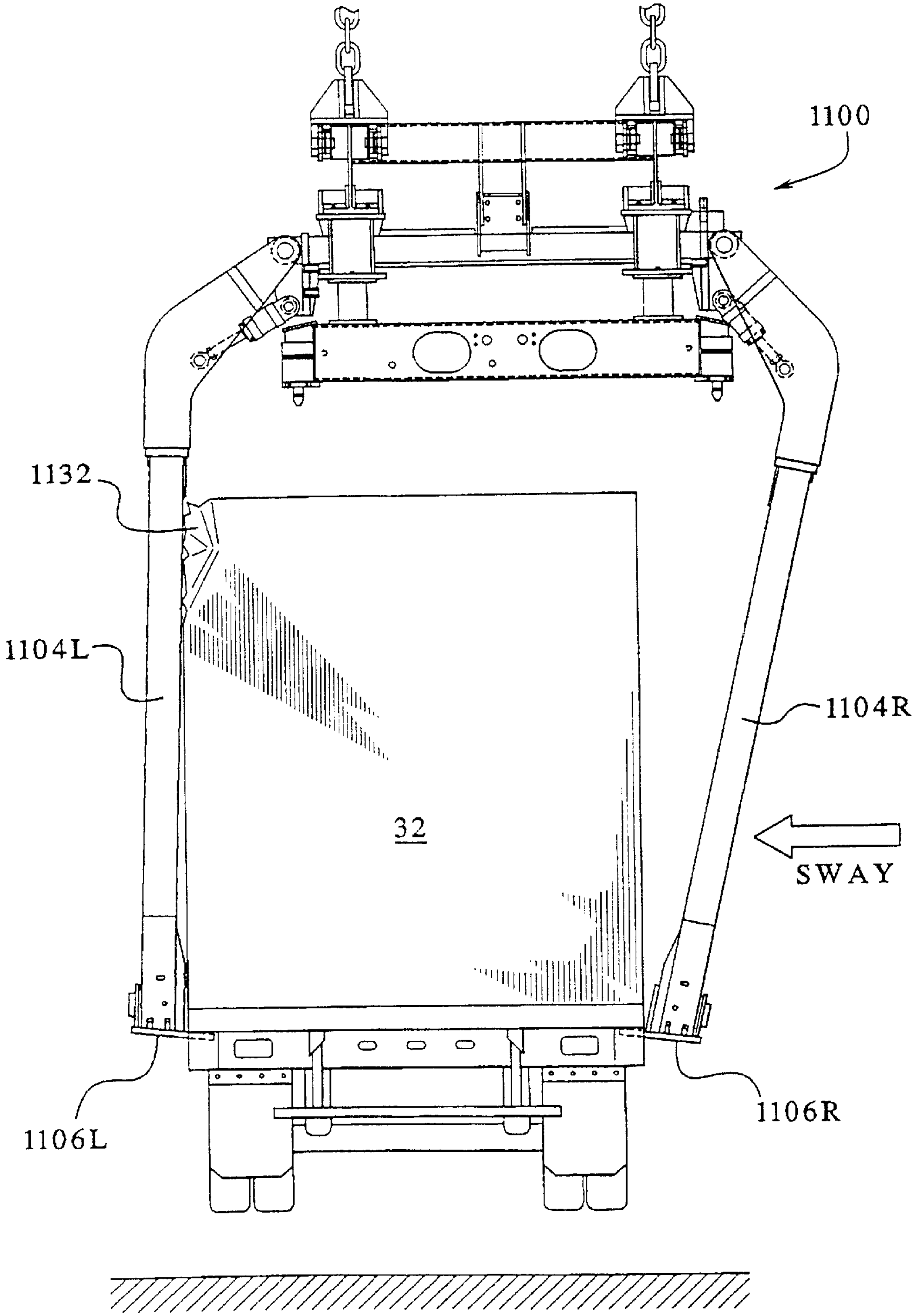
FIG.6 (PRIOR ART)

FIG. 6 is a front elevation of a grappler wherein the arms are actuated by the conventional hydraulic system of FIG. 5, the arms shown swaying to an excessive degree and damaging a lifted trailer.

Figure 7:
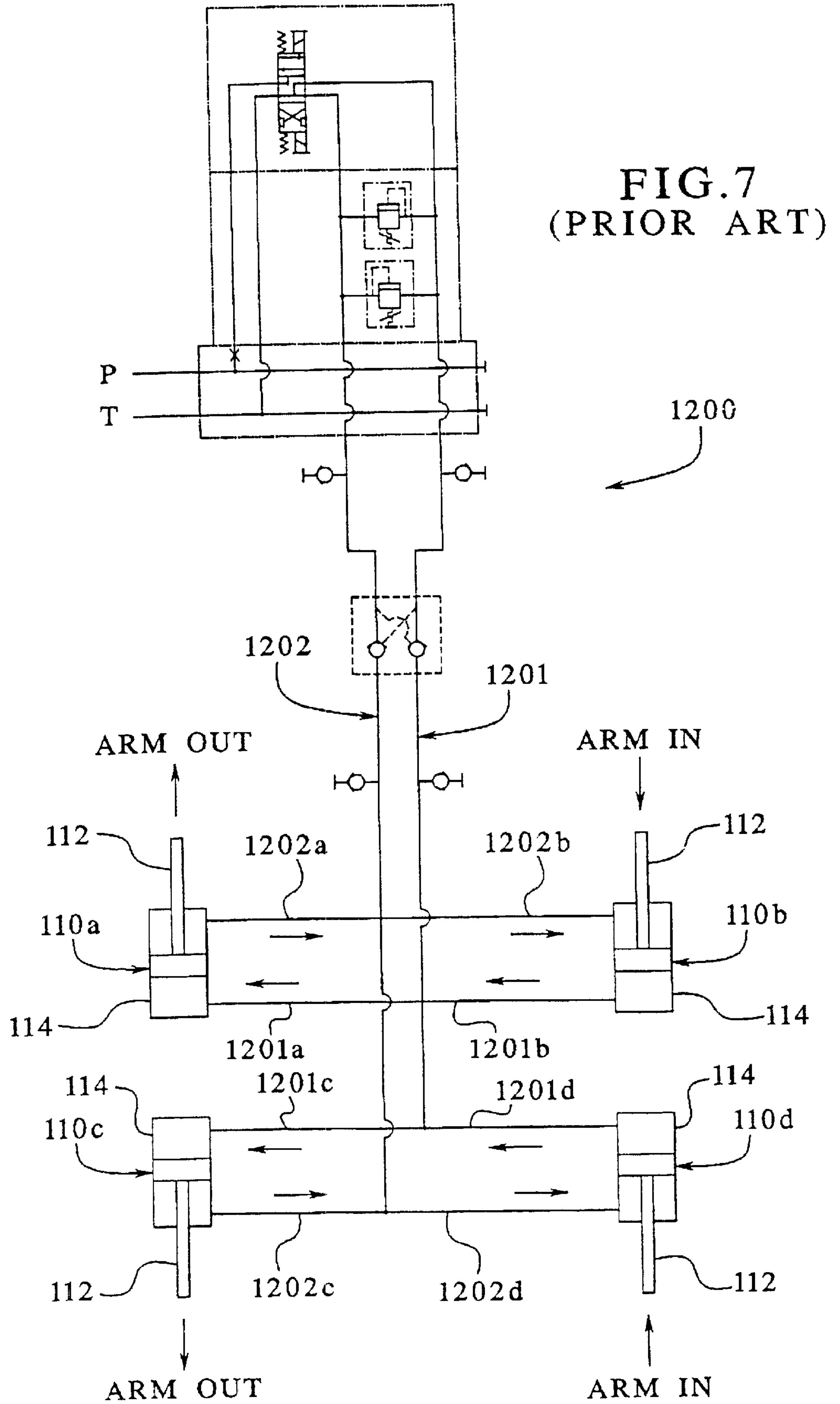
FIG.7 (PRIOR ART)

FIG. 7 is a schematic diagram illustrating a conventional hydraulic circuit for moving the arms of a grappler.

FIG. **8*a*** is a schematic diagram illustrating an exemplary hydraulic circuit according to teachings of the invention, wherein the dampener includes a check valve and a flow restrictor.

Figure 8A:
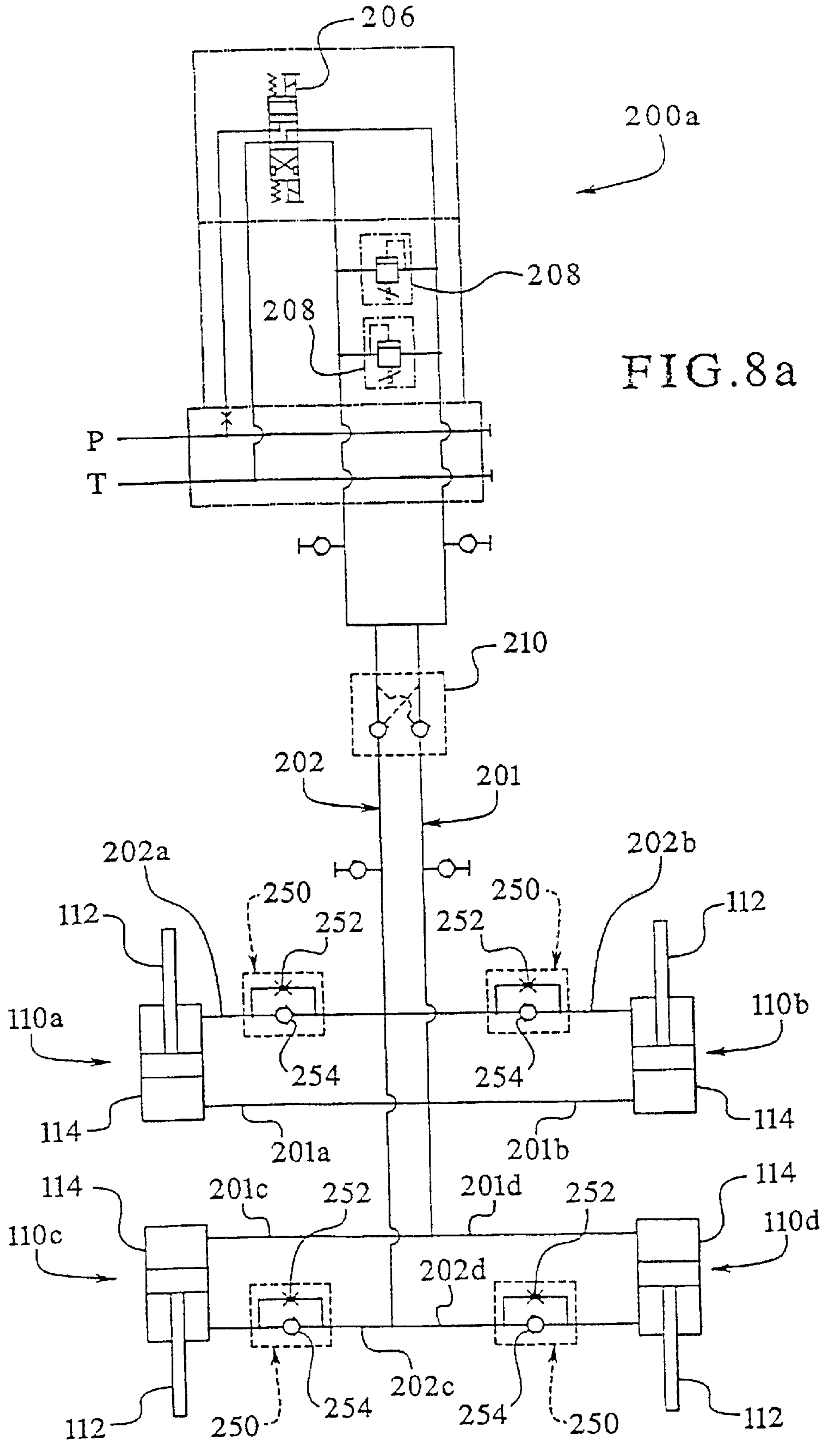
Figure 8B:
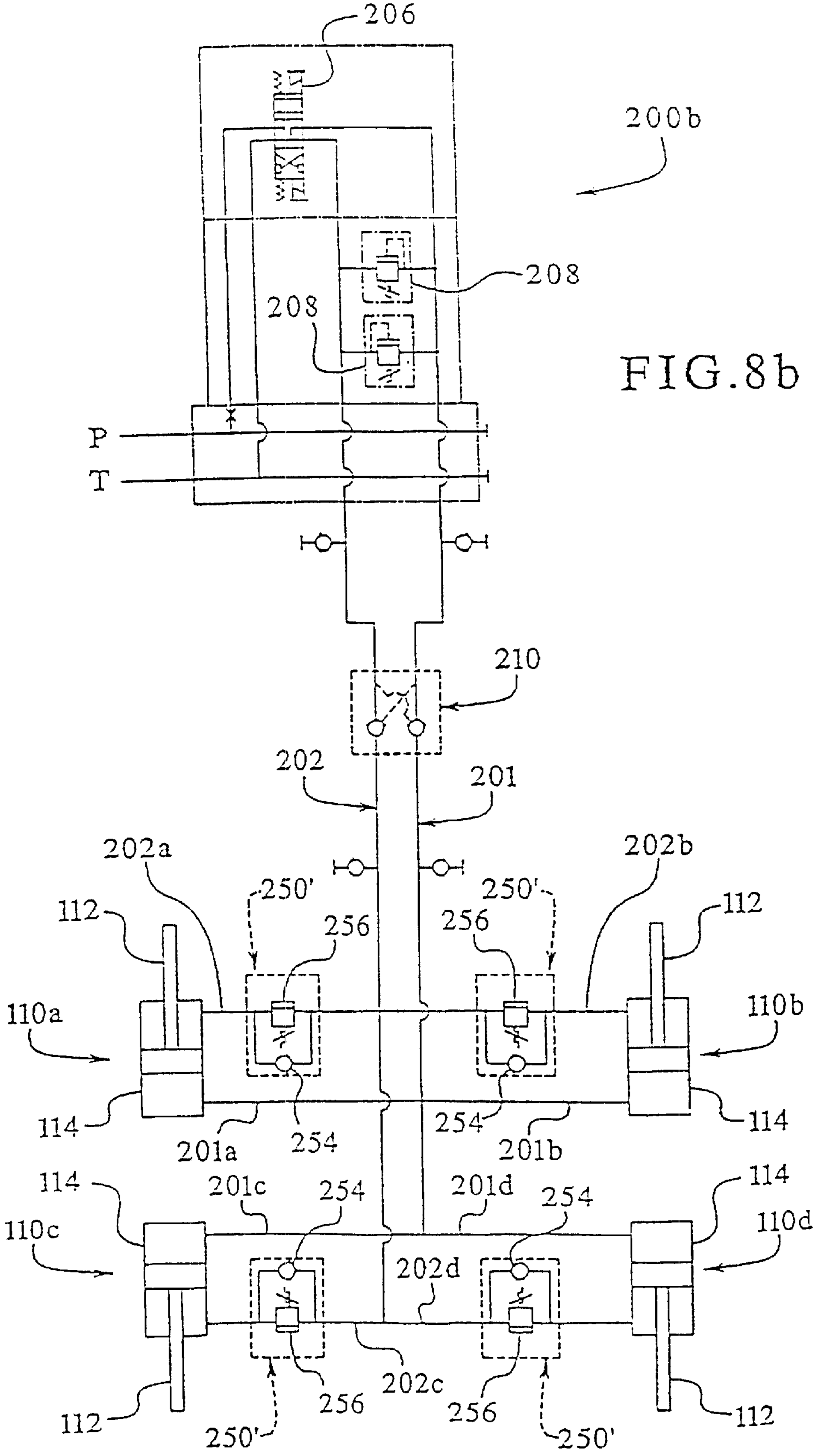

FIG. 8*b* is a schematic diagram illustrating an exemplary hydraulic circuit according to teachings of the invention, wherein the dampener includes a check valve and a counterbalance valve.

Figure 8C:
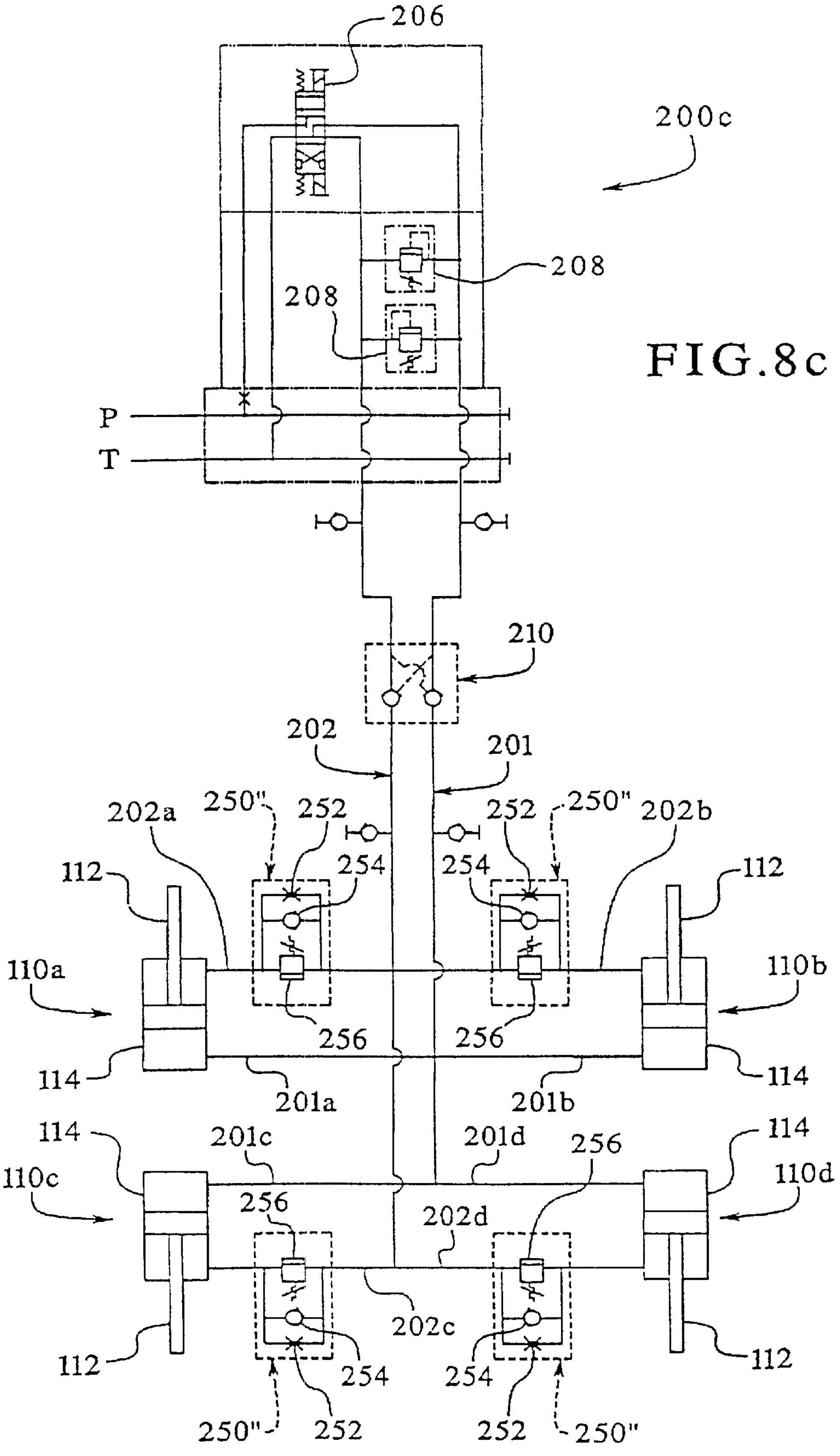

FIG. 8*c* is a schematic diagram illustrating an exemplary hydraulic circuit according to teachings of the invention, wherein the dampener includes a check valve, a flow restrictor and a counterbalance valve.

DETAILED DESCRIPTION OF THE PRESENTLY PREFERRED EMBODIMENTS

Now turning to the drawings, wherein like numeral designate like components, FIGS. 1, 2 and 3 illustrate an exemplary gantry crane 10 having a swing-arm style grappler 100. Gantry cranes are generally known, and although it is not required for practicing the invention, basic elements of the exemplary gantry crane 10 will be generally described before the inventive features will be described in detail.

As shown in FIG. 1, the gantry crane 10 includes a frame structure having four generally vertical columns 14RF, 14LF, 14RB, 14LB, a front support beam 16F rigidly mounted to extend generally horizontally between columns 14RF and 14LF, and a rear support beam 16R rigidly mounted to extend generally horizontally between columns 14RB and 14LB.

For vertical lifting capability, the crane 10 further includes a lifting means for vertically moving the grappler. Various lifting means will be recognized by those skilled in the art. For example, in the embodiment generally illustrated in FIGS. 1, 2 and 3, the lifting means includes vertically movable front and rear stabilizer beams 18F and 18B, respectively. The stabilizer beams 18F and 18B are movably mounted to extend generally horizontally between columns 14RF and 14LF and columns 14RB and 14LB, respectively. Various mechanisms may be used to actuate the vertical lifting of the stabilizer beams 18F, 18B. For example, as illustrated in FIG. 3, crane 10 includes a piston and cylinder type hydraulic actuator 20 connected to a cable or chain 21 that suspends the stabilizer beams 18B. By extending or retracting the piston of the hydraulic actuator 20, the cable 21 is moved to lower or raise the respective stabilizer beam 18B. A similar actuator and cable (not shown) are operable to move the other stabilizer beam 18F (FIG. 1). In another example, the lifting means can include a hoist system having movable wire ropes from which the grappler is suspended from overhead trolleys mounted to fixed upper beams of the crane. In an alternative structure, the stabilizer beams are suspended from wire ropes that are fed and retracted from a rotatable drum.

Although stationary cranes are known, cranes are typically mobile units adapted for maneuvering on a pavement. For example, as illustrated in FIG. 1, the crane 10 is equipped with a plurality of wheel assemblies 22RF, 22LF, 22RB, 22LB which support the columns 14RF, 14LF, 14RB, 14LB. The wheel assemblies are actuatable to drive, steer and maneuver the crane 10 on a pavement surface 23 in a desired manner.

To drive its various components, the crane 10 typically includes a hydraulic system which includes a plurality of hydraulic actuators to drive the various components. For example, hydrostatic motors are commonly used to drive the stabilizer beam lifting mechanism and to drive the wheels, and hydraulic pistons are commonly used for steering the wheel assemblies 22RF, 22LF, 22RB, 22LB, and operate various other crane functions, such as for moving elements of the grappler 100.

Referring to FIGS. 1 and 2, the crane 10 includes a cab 24 mounted to the frame 12 for accommodating an operator. The cab 24 contains controls for steering, driving, and maneuvering the crane 10 and for manipulating the motion and functions of the grappler 100. The crane 10 also includes a power unit 26, typically having an internal combustion engine driving a hydraulic pump (discussed below).

To prepare for lifting an object such as a trailer or shipping container, the operator maneuvers the crane 10 generally in position to straddle the object to be lifted by the grappler 100, such as illustrated. The operator then adjusts the grappler 100 to a more precise position ready to grip the object. For example, the grappler 100 is vertically movable by the lifting means, such as by raising or lowering the stabilizer beams 18F and 18B in the embodiment of FIGS. 1–3. As mentioned above, the grappler could be vertically movable by some other lifting means, such as by movable wire ropes of a hoist system which suspends the grappler from the trolleys. Referring to FIG. 1, for moving the grappler 100 in a side-to-side or transverse direction, as indicated by the axis T (FIGS. 3, 4*a*, 4*b* ), the grappler 100 is mounted to front and rear trolleys 28F and 28B, and each of the trolleys 28F, 28B is mounted to a respective one of the stabilizer beams 18F and 18R. Each of the trolleys 28F, 28B includes a plurality of rollers which glide along a surface of the respective stabilizer beam 18F, 18B. Each of the trolleys is driven by an appropriate means, for example, by cables actuated by a hydraulic piston or hydraulic motor.

Figure 4A:
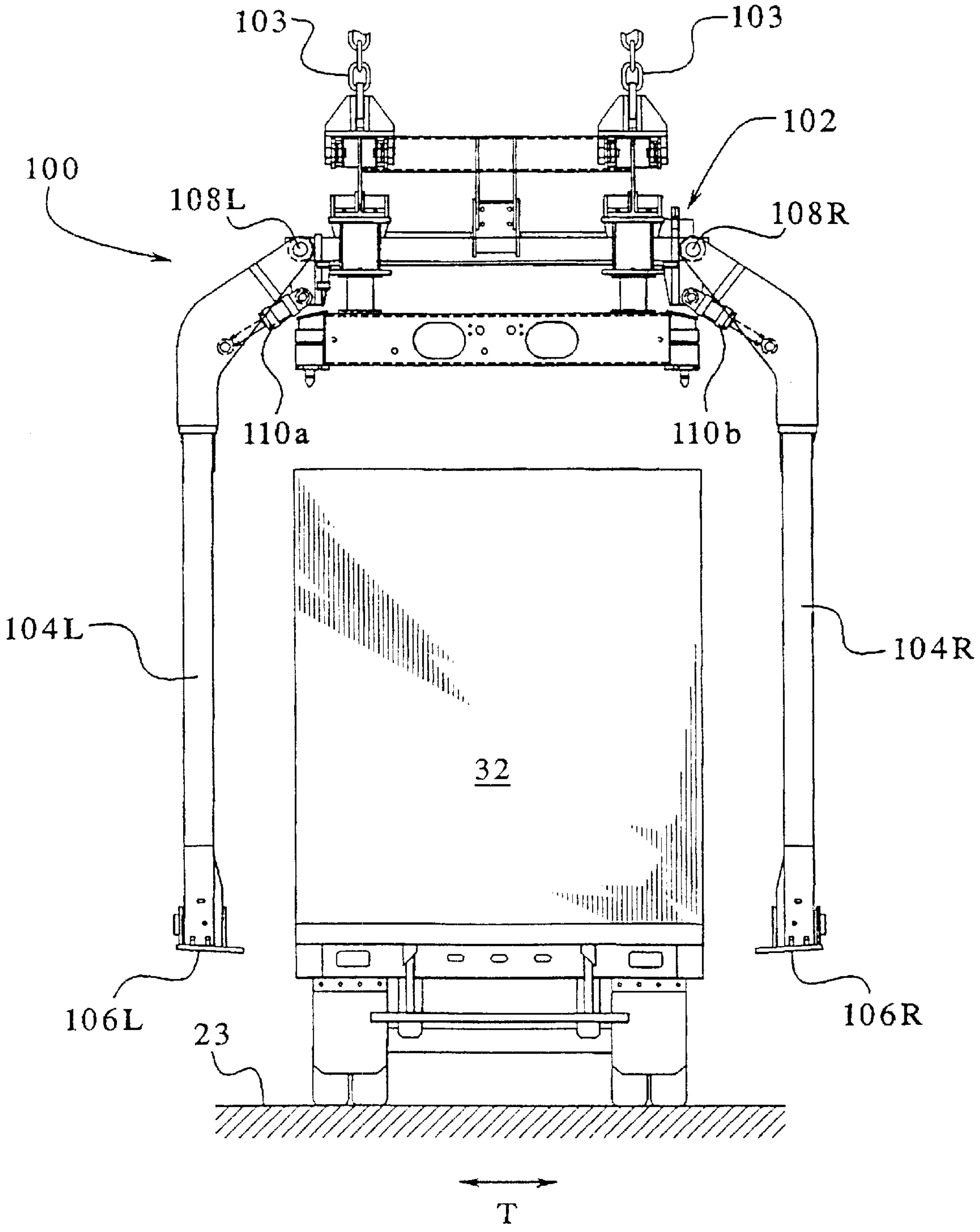
Figure 4B:
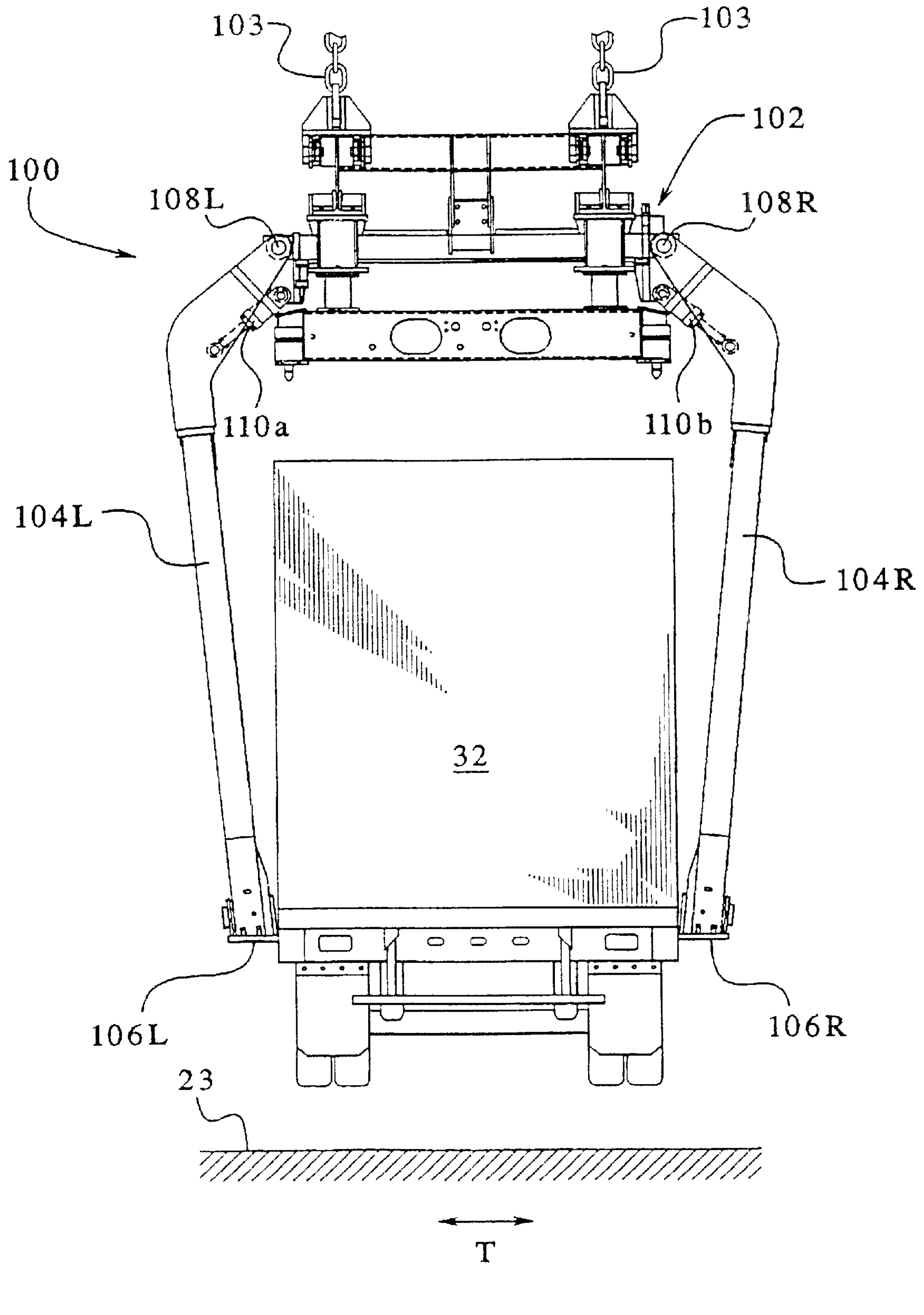

The grappler 100 is adapted to engage, lift and handle loads, such as a trailer 32, as illustrated in FIGS. 3, 4*a* and 4*b*. The grappler 100 generally includes a platform 102 and at least one pair, and typically two pairs, of elongate arms 104L, 104R. The platform 102 is suspended from the trolleys 28F, 28B (FIGS. 1 and 3) by chains 103 or some other appropriate structure. A lower end of each of the arms 104L, 104R includes a respective lifting shoe 106R, 106L which extends inwardly to reach under a holding surface, such as a structural frame member of the trailer for lifting. Each of the arms 104L, 104 R is pivotably mounted to the platform 102 at a hinge 108L, 108R and is movable about a respective rotational axis. In particular, each of the arms 104L, 104R is movable between an open position, as illustrated in FIG. 4*a*, and a closed or clamped position, as illustrated in FIG. 4*b*. When the arms 104L, 104R are in the open position (FIG. 4*a*), the grappler 100 is free from the trailer 32 for positioning movement, and when the arms 104L, 104R are in the closed position (FIG. 4*b*), the grappler 100 is ready to lift the trailer 32.

To move the arms, the crane 10 includes a plurality of hydraulic actuators 110*a*, 110*b*, 110*c*, 110*d* (only 110*a* and 110*b* are visible in FIGS. 4*a* and 4*b*), wherein each of the actuators is operable to drive an associated one of the arms 104L, 104R. In the example shown in FIGS. 1–5, each of the actuators 110*a*, 110*b*, 110*c*, 110*d* is a piston-cylinder assembly. More specifically, referring to FIG. 5, the actuator 110*a* is illustrated in greater detail to include a respective piston 112 and associated cylinder 114. In the grappler 100 illustrated in FIGS. 1–5, the actuators 110*a*, 110*b*, 110*c*, 110*d* are extended to move the respective arms 104L, 104R outwardly, and the actuators 110L, 110R are retracted to move the arms 104L, 104R inwardly.

Each of the arms 104L, 104R is sized to extend downwardly alongside the trailer 32 so that the shoes 106L, 106R are positionable under a frame of the trailer 32. As a result, the shoes 106L, 106R contact upwardly against the trailer 32 for lifting as the grappler 100 is raised.

Those skilled in the art will recognize that the grappler 100 may be used for lifting a variety of types of objects or containers, particularly objects having a lower surface or recess which can receive the shoes. Accordingly, the term "trailer" as used herein shall not be construed to limit the scope of the invention and includes any load, object or container capable of being lifted by the arms of the grappler.

When the grappler 100 is holding an elevated load, such as the trailer 32, acceleration and deceleration of the trolley 28R, 28F in a transverse direction results in "sway" forces tending to cause the arms 104L, 104R and trailer 32 to swing in an oscillating manner like a pendulum. The sway motion occurs through the hinges 108L, 108R on which the arms 104L, 104R are pivotably mounted to the platform 102.

In a conventional crane, grapplers have been known to sometimes sway by an excessive amount. For example, FIG. 6 illustrates a grappler 1100 of a conventional crane, whereby the swaying motion has caused one of the arms 1104L to cause damage 1132 to an upper portion of the trailer 32. Another disadvantage from swaying is that the shoes 1106L, 1106R rock to and fro, destabilizing their grip under the trailer 32. When the arms 1104L, 1104R sway as illustrated in FIG. 5, hydraulic fluid is exchanged between actuators 1110L on the left and actuators 1110R on the right through an exemplary conventional hydraulic circuit 1200, as shown in FIG. 7.

With reference to FIG. 7, the actuators 110*a*, 110*b*, 110*c*, 110*d* are illustrated as connected to the conventional hydraulic circuit 1200. The conventional hydraulic circuit 1200 includes a first supply conduit 1201 and a second supply conduit 1202. The first supply conduit 1201 has branches 1201*a*, 1201*b*, 1201*c* and 1201*d* which are in communication with a first end or base end of the cylinder 114 of each respective actuator 110*a*, 110*b*, 110*c*, 110*d* for extending the piston 112. The second supply conduit 1202 has a plurality of branches 1202*a*, 1202*b*, 1202*c*, 1202*d* in communication with a second end or rod end of the cylinder 114 of respective actuators 110*a*, 110*b*, 111*c*, 110*d* for retracting the pistons 112. Accordingly, pressurized fluid is directed to the first supply conduit 1201 to extend the pistons 112 and move the grappler arms outwardly to the open position. Pressurized fluid is directed to the second supply conduit 1202 to retract the pistons 112 and to move the grappler arms inwardly to the clamped position.

To indicate sway motion, labeled arrows shown in FIG. 7 correspond to the movement of the pistons when the grappler arms sway to the left, as in FIG. 6, wherein the sway motion of the loaded arms forces the pistons of the left side actuators 110*a* and 110*c* to extend while the pistons of the right side actuators 110*b* and 110*d* retract. The resulting volume change within the cylinder forces fluid flow (as indicated by arrows adjacent conduit branches 1201*a*, 1201*b*, 1201*c*, 1201*d*) to be effectively exchanged between the left side actuators 110*a* and 110*c* and right side actuators 110*b* and 110*d*. Of course, the flow direction and piston motion direction are reversed when the arms swayed to the right, opposite the sway condition shown in FIG. 6.

In accordance with an aspect of the invention, the crane is equipped with a hydraulic system for actuating the grappler arms between the unclamped and clamped positions respectively, wherein the flow resistance is applied at selected points of the hydraulic circuit, under certain conditions, to dampen arm sway when holding an elevated load. In a particular embodiment, the hydraulic circuit has a restrictor to resist flow between cylinders associated with arms on the respective left and right sides of the grappler. This flow resistance dissipates kinetic energy to dampen swaying motion of the arms and load.

To accommodate a standard sized trailer, in an exemplary embodiment, each of the arms 104L, 104R has a dimension of about 165 in. from the pivot 108L, 108R to the shoe 104L, 104R. The arms 104L, 104R are made of steel or some other material having high tensile strength to support heavily loaded trailers, which commonly weigh about 40,000 to 120,000 pounds. It will be understood that the crane 10 may be designed to handle loads which weigh less or more.

FIG. 8*a* illustrates an exemplary hydraulic system 200*a* having features in accordance with teachings of the invention. The hydraulic system 200*a* includes the hydraulic actuators 110*a*, 110*b*, 110*c*, and 110*d* for actuating each respective grappler arm 104L, 104R. In particular, actuators 110*a* and 110*c* are linked to drive the respective left arms 104L, and actuators 110*b* and 110*d* are linked to drive the respective right arms 104R. Additionally, actuators 110*a* and 110*b* respectively operate the left and right side arms 104L, 104R at a rear of the grappler (FIGS. 4*a*, 4*b*), and actuators 110*c* and 110*d* operate respective left and right side arms 104L, 104R at a front of the grappler. To direct pressurized fluid, a directional valve 206 selectively routs pressurized hydraulic fluid from a pump to either a first supply conduit 201 or a second supply conduit 202. Relief valves 208 and a dual pilot check valve 210 are provided in a known manner to relieve excess pressure differentials between the first and second supply conduits 201, 202.

The first supply conduit 201 has branches 201*a*, 201*b*, 201*c* and 201*d* associated with each respective pair of grappler arms (not shown), which are in respective communication with the base ends 114 of the actuators 110*a*, 110*b*, 110*c* and 110*d* for extending pistons 112. The second supply conduit 202 is in communication through the branches 202*a*, 202*b*, 202*c*, 202*d* with rod ends of each respective actuator 110*a*, 110*b*, 110*c* and 110*d* for retracting pistons 112. Accordingly, pressurized fluid is directed to the first supply conduit 201 to extend the pistons 112 and move the grappler arms outwardly to the open position (as in FIG. 4*a*). Pressurized fluid is directed to the second supply conduit 202 to retract the pistons 112 and to move the grappler arms inwardly to the clamped position (as in FIG. 4*b*).

The hydraulic system 200*a* includes a dual pilot check valve 210 and a pair of relief valves 208 in communication between the first and second supply conduits 201 and 202. The dual pilot check valve 210, under steady state conditions, maintains the positions of the respective actuators 110R, 110L and the associated arms 104L, 104R in clamped (FIG. 4*b*) or unclamped (FIG. 4*a*) positions.

A swaying motion of the loaded arms forces the pistons to move within the cylinders. The corresponding volume change results in a transfer of fluid between the cylinders linked to the respective left and right arms. Volumetric changes of the base ends of the cylinders 114 are accommodated by a flow of fluid through the branches 201*a*, 201*b*, 201*c* and 201*d* of the first supply conduit 201 from between the left side actuators 110*a*, 110*c* and right side actuators 110*b*, 110*d*, respectively. Likewise, sway-induced movement of the piston causes a fluid transfer between the rod ends of the left side actuators 110*a*, 110*c* and right side actuators 110*b*, 110*d*, respectively, through the branches 202*a*, 202*b*, 202*c*, 202*d* of the second supply conduit 202. In the illustrated exemplary hydraulic system 200*a*, the flow exiting the rod ends of cylinder 114 is restricted.

In accordance with an aspect of the invention, hydraulic system 200*a* includes a plurality of dampeners 250 effective to dampen swaying of the arms. More specifically, the dampeners 250 provide a dampening resistance to induced flow caused by volumetric changes in the actuators caused by pendulating momentum of the load acting on the arms, as opposed to flow caused by positive actuation. In the exemplary hydraulic system 200*a*, each of the four actuators 110R, 110L is equipped with a respective one of the dampeners 250. Each of the dampeners 250 is located on a respective one of the branches 202*a*, 202*b*, 202*c* and 202*d* of the second fluid supply conduit 202 in communication with the rod ends of the respective cylinders 114. Accordingly, the dampeners 250 resist flow leaving the respective base ends to thereby dampen a piston extension motion when the arm sways in an outward direction.

With reference to FIG. 4*b*, to enhance the contact of the shoes 106L, 106R under the trailer 32, the hydraulic system is configured to apply a dampening resistance to arms 104L being pushed outwardly by the pendulous load. The opposite arms 104R which are simultaneously pulled inwardly while following the trailer, are preferably permitted to freely move inwardly without added dampening resistance. This configuration optimizes the proper contact of the shoes 106L by applying a selective resistance force which urges the shoes 106L inwardly against the trailer 32. Of course, when the sway is in the opposite direction, the outwardly pushed arms 104R are dampened and the following arms 104L are not; thereby enhancing the contact of shoes 106R.

Turning back to FIG. 8*a*, each of the dampeners 250 includes a restrictor 252 having an orifice sized to impede flow and thereby dampen sway of the grappler arms. The pressure differential across the orifice creates a force in the cylinder to oppose motion of an associated one of the pistons. The pressure differential dissipates kinetic energy of the arm and the resulting force effectively dampens the pendulum motion or swaying of the arms holding a trailer. However, the dampener 250 is configured to not create a pressure drop that would interfere with the normal flows needed to actuate motion of the grappler arms.

For free inward arm motion, the dampener 250 includes a check valve 254 arranged to permit fluid to flow freely toward the cylinder. As shown schematically, the check valve 254 is arranged in parallel to restrictor 252, and accordingly, flow through the check valve 254 does not need to flow through the restrictor 252. When the directional valve 206 directs pressurized fluid into the second fluid supply conduit 202, pressurized fluid passes through the check valves 254 to the respective rod ends of the cylinders 114.

In an embodiment, a suitable system main flow area of about 0.1104 sq. in. (i.e., a ⅜ in. diameter conduit) and an orifice area of about 0.001256 sq. in. (i.e., a diameter of about 0.040 in.). To be driven by this system, a suitable piston/cylinder actuator has a bore diameter of about 3.25 in. and a rod diameter of about 2.0 in., equating to a rod end piston area of about 5.15 sq. in. and a base end piston area of about 8.29 sq. in. The actuator has a stroke of about 2.50 in. The orifice area is selected to provide suitable dissipation of kinetic energy for a crane having two pairs of arms, each arm having a length of about 165 in., a trolley speed of up to about 100 ft/min, and a trailer weight of up to 120,000 lbs. A commercially available device suitable for use as a restrictor is marketed as a FLEXIBLE SEAL SEAT™, Prod. No. 1306, available from Kepner Products Co., Villa Park, Ill. 60181. This device provides free or relatively unrestricted flow in one direction and metered or restricted flow in a reverse direction.

As a result of the dampening action of the dampeners 250, the crane 110 can handle a lifted trailer 32 with a more stable operation. The sway reduction provided by the dampeners 250 reduces the likelihood that a shoe can slip or become disengaged from a trailer. Also, the reduction in sway reduces the likelihood that an arm can impact and damage a trailer body.

The dampener can include other types of structures for limiting and controlling flow in a manner to dampen sway of the grappler arms. For example, a counterbalance valve may be provided in lieu of, or in addition to, the restrictor, as illustrated in FIGS. 8*b* and 8*c*, respectively. FIG. 8*b* shows a hydraulic system 200*b* according to an embodiment which is generally as described in connection with the hydraulic system 200*a* of FIG. 8*a*, however, the system 200*b* includes dampeners 250', each of which has a check valve 254 to permit free flow through the conduit branch 202*a*, 202*b*, 202*c* and 202*d* toward the respective actuator 110*a*, 110*b*, 110*c* and 110*d* and a counter-balance valve 256 connected in parallel to the check valve 254. The counterbalance valve 256, which may be of a type generally known, permits flow through the conduit branch 202*a*, 202*b*, 202*c* and 202*d* away from the actuator 110*a*, 110*b*, 110*c* and 110*d*. More specifically, when the pressure of fluid exceeds a threshold pressure, the counterbalance valve 256 opens to permit a rate of flow. In an embodiment, the counterbalance valve 256 is adjustable to vary the threshold pressure. FIG. 8*c* shows a hydraulic system 200*c* which is generally similar to the systems 200*a* and 200*b* as described in connection with FIGS. 8*a* and 8*b*, however, they hydraulic system 8*c* includes dampeners 250". Each of the dampeners 250" has a check valve 254, a counter-balance valve 256, and a restrictor 252, all connected in parallel. The check valve 254 permits free flow through the conduit branch 202*a*, 202*b*, 202*c*, and 202*d* toward the respective actuator 110*a*, 110*b*, 110*c* and 110*d*. Flow away from the associated nearby actuator 110*a*, 110*b*, 110*c* and 110*d*, as would occur during sway of the associated arm, flows through the restrictor to dampen sway motion. When the pressure away from the actuator 110*a*, 110*b*, 110*c* and 110*d* exceeds a predetermined amount, the counterbalance valve 256 opens to permit a greater amount of flow through the conduit branch 202*a*, 202*b*, 202*c* and 202*d* away from the actuator.

An advantage of the counterbalance valve 256 in dampeners 250' (FIG. 8*b*), 250" (FIG. 8*c*) is that counterbalance valve can reduce damage to the grappler by permitting flow upon in an impact of against the load or arms, which causes a momentary spike in fluid pressure While the invention is described herein in connection with certain preferred embodiments, the invention is not limited it to those embodiments. On the contrary, it is recognized that various changes and modifications to the described embodiments will be apparent to those skilled in the art, and that such changes and modifications may be made without departing from the spirit and scope of the present invention. Accordingly, the intent is to cover all alternatives, modifications, and equivalent is within the spirit and scope of the invention as defined by the appended claim.

What is claimed is:

1. A gantry crane comprising:

a frame structure;

a grappler movably suspended from the frame structure, the grappler having a platform and at least one pair of cooperating arms for lifting a load below the platform, the arms being mounted to the platform for pivotable movement on respective rotational axes which are parallel to each other, the arms being pivotable inwardly toward each other to clamp the load, the arms being pivotable outwardly away from each other to free the load; the grappler being laterally moveable relative to the frame in a generally horizontal direction perpendicular to said axes;

a hydraulic system for moving the arms, including:

- a hydraulic actuator operably linked to pivot a respective one the arms;
- a first conduit in communication with the actuator such that fluid flows to the actuator through the first conduit to pivot the respective arm outwardly;
- a second conduit in communication with the actuator such that fluid flows to the actuator through the second conduit to pivot the respective arm inwardly; and at least one dampener operable to permit restricted flow through an associated one of the conduits away from the actuator caused by sway motion of the respective arm.

2. The gantry crane of claim 1, wherein the dampener is operable to restrict flow as the respective arm sways outwardly and to permit free flow through the conduit as the respective arm sways inwardly.

3. The gantry crane of claim 1, wherein the actuator is a piston/cylinder assembly having opposite base and rod ends, the actuator being mounted such that the piston is extended when the arm is moved outwardly and the piston is retracted when the arm is moved inwardly.

4. The gantry crane of claim 3, wherein the first conduit is in communication with the base end and wherein the second conduit is in communication with the rod end; and wherein the dampener is operable to restrict flow through the second conduit.

5. The gantry crane of claim 1, wherein each of the dampeners comprises a check valve to permit a free flow of fluid through the associated conduit toward the actuator.

6. The gantry crane of claim 5, wherein each of the dampeners comprises a restrictor having an orifice having a flow area smaller than a flow area of the conduit.

7. The gantry crane of claim 6, wherein the check valve permits free flow of fluid through the associated conduit toward the cylinder and directs flow away from the cylinder through the orifice.

8. The gantry crane of claim 5, wherein the dampener further includes a counterbalance valve connected in parallel to the check valve such that the counterbalance valve permits flow through the conduit away from the actuator when pressure exceeds a predetermined threshold.

9. The gantry crane of claim 1, comprising a plurality of the actuators, each of the actuators for actuating a respective one of the arms, the second conduit having a plurality of branches, each of the branches in communication with a respective one of the actuators, one of the dampeners disposed in each of the branches.

10. A hydraulic system for operating a grappler of a gantry crane, the grappler having a platform and at least one pair of opposite arms for lifting a load below the platform, each of the arms being mounted to the platform for pivotable movement on respective rotational axes which are parallel to each other, the arms being pivotable inwardly toward each other to clamp the load, the arms being, pivotable outwardly away from each other to free the load; the grappler being laterally moveable relative to the frame in a generally horizontal direction perpendicular to said axes; the hydraulic system comprising:

- a hydraulic actuator operably linked to pivot a respective one the arms;
- a first conduit in communication with the actuator such that fluid flows to the actuator through the first conduit to pivot the respective arm outwardly;
- a second conduit in communication with the actuator such that fluid flows to the actuator through the second conduit to pivot the respective arm inwardly; and
- at least one dampener operable to permit restricted flow through an associated one of the conduits away from the actuator caused by sway motion of the respective arm for dampening the sway motion.

11. The hydraulic system of claim 10, wherein the dampener is operable to restrict flow as the respective arm sways outwardly and to permit free flow through the conduit as the respective arm sways inwardly.

12. The hydraulic system of claim 10, wherein the actuator is a piston/cylinder assembly having opposite base and rod ends, the actuator being mounted such that the piston is extended when the arm is moved outwardly and the piston is retracted when the arm is moved inwardly.

13. The hydraulic system of claim 12, wherein the first conduit is in communication with the base end and wherein the second conduit is in communication with the rod end; and wherein the dampener is operable to restrict flow through the second conduit.

14. The hydraulic system of claim 10, wherein each of the dampeners comprises a check valve to permit a free flow of fluid through the associated conduit toward the actuator.

15. The hydraulic system of claim 14, wherein each of the dampeners comprises a restrictor having an orifice having a flow area smaller than a flow area of the conduit.

16. The hydraulic system of claim 15, wherein the check valve permits free flow of fluid through the associated conduit toward the cylinder and directs flow away from the cylinder through the orifice.

17. The hydraulic system of claim 14, wherein the dampener further includes a counterbalance valve connected in parallel to the check valve such that the counterbalance valve permits flow through the conduit away from the actuator when pressure exceeds a predetermined threshold.

18. The hydraulic system of claim 10, comprising a plurality of the actuators, each of the actuators for actuating a respective one of the arms, the second conduit having a plurality of branches, each of the branches in communication with a respective one of the actuators, one of the dampeners disposed in each of the branches.

19. A grappler for a gantry crane, the grappler comprising:

- a plurality of right arms and a plurality of corresponding left arms, the right and left arms being pivotably movable inwardly toward each other to clamp a load and outwardly away from each other to free a load;
- a plurality of hydraulic cylinders to drive the pivotable motion of the arms;
- a first conduit having a plurality of branches, each of the branches in communication with a first end of a respective one of the cylinders;
- a second conduit having a plurality of branches, each of the branches in communication with a second end of a respective one of the cylinders; and
- a plurality of dampeners, each of the dampeners disposed in a respective one of the branches of the second conduit to permit restricted flow caused by non-actuated outward pivotal movement of the respective arm.

20. The grappler of claim 19, wherein each of the dampeners permits unrestricted flow caused by non-actuated inward pivotal movement of the respective arm.

21. The grappler of claim 19, wherein each of the dampener includes:

- a check valve in the conduit to permit free flow of fluid toward the cylinder; and
- a restrictor connected in parallel with the check valve, the restrictor including an orifice having an area smaller than an area of the second conduit; wherein the check-valve causes flow away from the cylinder to be directed through the orifice.

22. The grappler of claim 19, wherein each of the dampener includes:

- a check valve in the conduit to permit free flow of fluid toward the cylinder; and
- a counterbalance valve connected in parallel with the check valve, the counterbalance valve which permits restricted flow in a direction away from the cylinder; wherein the checkvalve causes flow away from the cylinder to be directed through the orifice.

* * * * *